US006999968B1

(12) United States Patent
Parkin (10) Patent No.: US 6,999,968 B1
(45) Date of Patent: Feb. 14, 2006

(54) FAST MERGE INTO LARGE ORDERED SETS

(75) Inventor: Robert E. Parkin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 10/306,967

(22) Filed: Nov. 27, 2002

(51) Int. Cl.
*G06F 7/00* (2006.01)

(52) U.S. Cl. .......................................... 707/101; 707/7
(58) Field of Classification Search ................ 707/100, 707/7, 101
See application file for complete search history.

(56) References Cited

U.S. PATENT DOCUMENTS

| 5,983,215 | A   | * | 11/1999 | Ross et al. ...................... 707/2 |
| 6,370,547 | B1  | * | 4/2002  | Eftink ......................... 707/201 |
| 6,711,563 | B1  | * | 3/2004  | Koskas .......................... 707/3 |
| 6,763,359 | B1  | * | 7/2004  | Lohman et al. ............. 707/102 |
| 6,782,383 | B1  | * | 8/2004  | Subramaniam et al. ......... 707/3 |
| 2003/0135495 | A1 | * | 7/2003 | Vagnozzi ....................... 707/3 |
| 2003/0212670 | A1 | * | 11/2003 | Yalamanchi et al. ........... 707/3 |
| 2003/0217033 | A1 | * | 11/2003 | Sandler et al. ................. 707/1 |

FOREIGN PATENT DOCUMENTS

| JP | 05120344 A   | * | 5/1993 |
| JP | 07093130 A   | * | 4/1995 |
| JP | 2001331353 A | * | 11/2001 |

OTHER PUBLICATIONS

Motro, Ahihai. "Superviews: Virtual Integration of Multiple Databases", IEEE Transactions on Software Engineering, vol. SE-13, No. 7, Jul. 1987, 785-98.*
Cholvy, Laurence and Serafin Moral. 2001. "Merging Databases: Problems and Examples." *International Journal of Intelligent Systems* 16: 1193-1221.
Motro, Ahihai. 1987. "Superviews: Virtual Integration of Multiple Databases." *IEEE Transactions on Software Engineering* SE-13 (Jul.): 785-98.
Press, William H. et al. 1986. *Numerical Recipes: The Art of Scientific Computing.* New York: Cambridge University Press: 232-235.
MetaMatrix Product Infromation. nd. MetaBase™: "Cross-platform Metadata Management System." 8pp. Available http://www.metamatrix.com/12_prdcts.html.

* cited by examiner

*Primary Examiner*—Jean M. Corrielus
*Assistant Examiner*—Chongshan Chen
(74) *Attorney, Agent, or Firm*—Ronald M. Anderson (57) ABSTRACT

A virtual merge of update data into a large ordered data set, such as an encyclopedia database. The ordered set is stored on a client, and includes original indices defined by a server, which also defines an initial index for each entry to be added to the ordered set as an update, where each initial index corresponds to a position that the entry would occupy in the ordered set if the entry were considered alone. An exception table is created by incrementing the initial indices by a number of entries to be added prior to a current entry and by decrementing for prior deleted entries. The client creates a dynamically ordered set from at least a portion of the large ordered set by analogously incrementing and/or decrementing the original indices. The dynamically ordered set and exception table define a virtually merged database that the client can access dynamically.

26 Claims, 8 Drawing Sheets

ORIGINAL ORDERED SET

| ORIGINAL INDEX | ORIGINAL VALUE (OR SORT KEY) |
|---|---|
| 0 | AARON |
| 1 | ABLE |
| 2 | ANNIE |
| 3 | ANNY |
| 4 | DOG |
| 5 | DRAG |
| 6 | JACK |
| 7 | JILL |
| 8 | KILT |
| 9 | KING |
| 10 | KONG |

FIG. 5

DYNAMICALLY ORDERED SET

| MERGED INDEX | ORIGINAL VALUE |
|---|---|
| 0 | AARON |
| 1 | ABLE |
| [DELETED] | ANNIE |
| 2 | ANNY |
| 4 | DOG |
| 5 | DRAG |
| 7 | JACK |
| 8 | JILL |
| 9 | KILT |
| 10 | KING |
| 11 | KONG |

FIG. 3A

PREDETERMINED ADD TABLE

| INITIAL INDEX | ADDED VALUE |
|---|---|
| 4 | DIG |
| 6 | DUG |
| 11 | ZERO |

FIG. 4

EXCEPTION TABLE

| MERGED INDEX | MERGED VALUE |
|---|---|
| 3 | DIG |
| 6 | DUG |
| 12 | ZERO |

FIG. 3B

PREDETERMINED DELETE TABLE

| ORIGINAL INDEX | DELETED VALUE |
|---|---|
| 2 | ANNIE |

| ORIGINAL ORDERED SET | |
|---|---|
| ORIGINAL INDEX | ORIGINAL VALUE (OR SORT KEY) |
| 0 | AARON |
| 1 | ABLE |
| 2 | ANNIE |
| 3 | ANNY |
| 4 | DOG |
| 5 | DRAG |
| 6 | JACK |
| 7 | JILL |
| 8 | KILT |
| 9 | KING |
| 10 | KONG |

*FIG. 2*
(REPEATED FOR CLARITY)
60

| DYNAMICALLY ORDERED SET | |
|---|---|
| MERGED INDEX | ORIGINAL VALUE |
| 0 | AARON |
| 1 | ABLE |
| [DELETED] | ANNIE |
| 2 | ANNY |
| [DELETED] | DOG |
| 4 | DRAG |
| 7 | JACK |
| 8 | JILL |
| 9 | KILT |
| 10 | KING |
| 11 | KONG |

| COMBINED ADD TABLE | |
|---|---|
| INITIAL INDEX | ADDED VALUE |
| 4 | DIG |
| 6 | DUG |
| 6 | DYLE |
| 11 | ZERO |

*FIG. 8A*

| CONSOLIDATED EXCEPTION TABLE | |
|---|---|
| MERGED INDEX | MERGED VALUE |
| 3 | DIG |
| 5 | DUG |
| 6 | DYLE |
| 12 | ZERO |

*FIG. 9*
80b

| COMBINED DELETE TABLE | |
|---|---|
| ORIGINAL INDEX | DELETED VALUE |
| 2 | ANNIE |
| 4 | DOG |

FAST MERGE INTO LARGE ORDERED SETS

FIELD OF THE INVENTION

The present invention generally relates to a method and system for performing a virtual merge of data with a large ordered data set, and more specifically, pertains to creating a virtual database comprising the large ordered set and one or more substantially smaller other ordered sets.

BACKGROUND OF THE INVENTION

The need to merge data sets arises in a variety of different applications. For example, to update the content of an encyclopedia database installed on client computers, the client computers may periodically connect online (e.g., over the Internet) with a designated server to obtain additional data reflecting changes and additions to the original data in the encyclopedia. After the client computers download the updates, it would be desirable to provide a merged database that includes the original information in the encyclopedia database and the new information downloaded as updates. By providing a merged data set, a user of the encyclopedia program can efficiently search a single set of data and can browse the data in order, e.g., alphabetically. If the data sets are not merged, the user will be required to browse the updates separately from the original encyclopedia data.

One approach to solving this problem provides for directly integrating the data sets (i.e., the original data set and the one or more new data sets) to form a merged data set and is sometimes referred to as producing a physical merge of the data sets. In this approach, the data within each set are compared with the data in the one or more other sets to determine the relative ordered positions of each datum from all sets involved in the merge. The data from all sets are then interleaved and stored together in the final merged set in which all of the data entries are correctly ordered. This approach requires sufficient memory resources to store each original data set and the final merged set and a relatively fast processor to process the data in the sets. For very large ordered sets, the required memory may exceed the available memory. Furthermore, it may be impractical to merge the data sets on a computer that has the required memory resources and then transfer the resulting merged data set to a computer on which the merged data set will be used, but which doesn't have the required memory or processing resources. Communication of a very large merged data set to a remote site, such as from a server to a client computer over the Internet or other network, often requires a substantial amount of time, even with a relatively high bandwidth connection between the server and client. The required time will typically not be acceptable to a user on a client computer, particularly if the entire merged data set must be transmitted after a relatively smaller data set is merged with a substantially larger original data set that is already stored on the client computer.

Of course, if the client computer has the original data set and is provided the required memory resources to load the entire original set and the new data sets into memory, it may be necessary to transmit only the smaller new data set to the client computer from the server. The client computer can then perform a physical merge of the data sets. However, even such a local merge often requires an undesirably long time, because each datum in the new data set must be compared with data in the original data set to determine the correct position of the each new datum in the merged data set.

The second approach typically used to address this problem creates a meta-data mapping for the data of each set, and is sometimes referred to as creating a virtual merge, or a virtual database. The data within each smaller new set must still be compared with the data in the original larger data set to determine relative positions of each datum. However, the data in the original data set and each new data set are not stored together in a final merged set. Instead, a schema, or other mapping, is used to associate each datum with its relative position in the virtual merged data set. The mapping identifies the relative position of each datum in a virtual database. In this case, each data set is typically maintained in its original form, and the schema maps the original data to the virtually merged database. However, for very large ordered sets, the additional metadata required for mapping a virtual database may strain computing, memory, and communication resources as much as a physical merge. In the case of very large homogeneous data sets, which share the same data structure, it is desirable to update, or otherwise merge the data sets without a physical merge and without adding a complex schema of metadata to map all of the original data into a virtual database. A new approach is thus required that produces a virtual database in which the data sets are merged, while avoiding the problems noted above.

SUMMARY OF THE INVENTION

The present invention provides a method and system for creating a virtually merged database by virtually merging an original ordered set with a new ordered set, which have homogeneous data structures. The original ordered set is preferably a large dataset, such as a digital encyclopedia, and comprises at least one original index and at least one corresponding original sort key. The new ordered set represents at least a portion of an update to the original ordered set. Specifically, the new ordered set comprises new data items to be added to the original ordered set. From the new ordered set, an add table is created that comprises at least one new initial index and at least one corresponding new sort key. Each new initial index defines a sort order that the corresponding new sort key would take in the original ordered set, relative to the original sort keys in the original ordered set. In other words, a new initial index represents the position that a corresponding new data item would take in the original ordered set, if the new data item were the only new data item physically merged into the original ordered set.

The add table is then modified into an exception table that reflects a virtually merged sort order of each new data item, when preceding new items are also considered merged into the original ordered set. Specifically, each new initial index is incremented for each new sort key that has a sort order prior to the new sort key currently being processed. The resulting indices of the exception table represent the sort order of the new data items in the virtually merged database. Similarly, at least a portion of the original ordered set is modified into a dynamically ordered set by incrementing each original index for each new sort key that has a sort order prior to the original sort key currently being processed. For example, an original index may be incremented by one for each new initial index that is less than or equal to the original index. The resulting indices of the dynamically ordered set represent the sort order of the original data items in the virtually merged database. Deletions of data items from the original ordered set can also be accommodated by analogously decrementing the indices of the exception table and dynamically ordered set. The dynamically ordered set and the exception table together define the virtually merged database.

Preferably, the original ordered set is available on a client device, and updates are provided over a network by a remote server device. An update may comprise additions and/or deletions. Accordingly, each update is preferably predefined by the server device with an add table and/or a delete table, both of which include an original index for each added and/or deleted item. To prepare for the situation in which a user wishes to apply one or more contiguous updates, the server device can predefine the corresponding exception table, so that the exception table can be immediately downloaded to the client device when requested. However, for the situation in which the user wishes to apply two or more non-contiguous updates, it is more efficient to create the exception table after the individual desired updates are identified and requested. In this case, the exception table can also be created by the server device, but is preferably created by the client device after downloading the add and/or delete tables associated with the selected updates.

In any case, the client device uses the add table, delete table, and/or exception table to create the dynamically ordered set. Preferably, the client dynamically creates the dynamically ordered set from incremental portions of the original ordered set, based on a search or browse request. The incrementally created dynamically ordered set is used along with the exception table as a moving window into the virtually merged database. This dynamic process reduces time required to virtually merge the update data with the original data and display or otherwise use the merged data.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
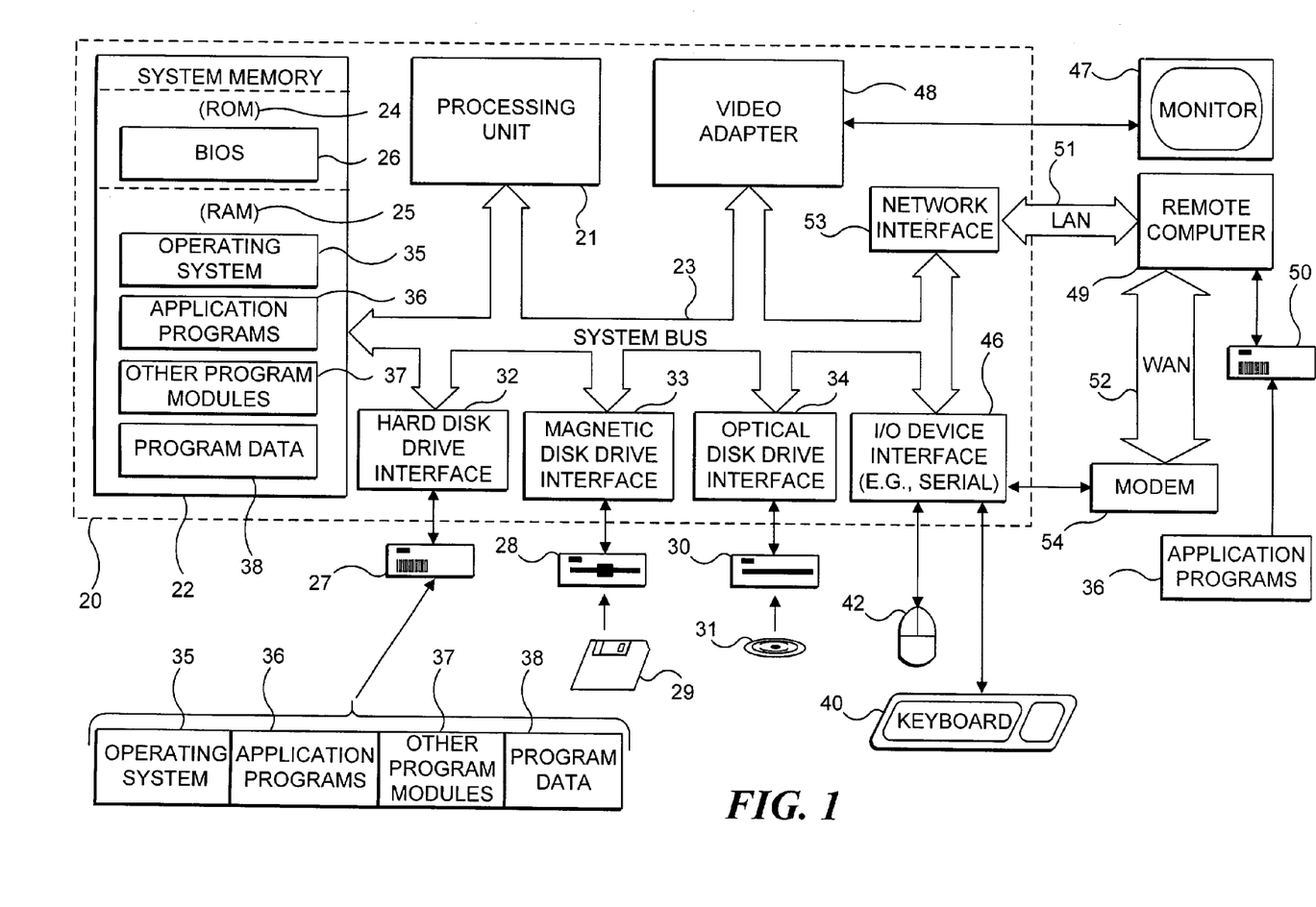
FIG. 1 is a schematic block diagram of an exemplary personal computer (PC) system suitable for implementing the present invention, in regard to both a server and a client computer.

FIG. 1 and the following discussion are intended to provide a brief, general description of a suitable computing environment for use in implementing the present invention. Although not required, a portion of the present invention will be described in the general context of computer executable instructions, such as program modules that are executed by a PC. Generally, program modules include routines, programs, objects, components, data structures, etc. that perform particular tasks or implement particular abstract data types. Those skilled in the art will appreciate that this invention may be practiced with other computing system configurations that include peripheral devices, hand held devices, pocket personal computing devices, digital cell phones, game consoles, TV set-top boxes, multiprocessor systems, network PCs, minicomputers, mainframe computers, industrial control equipment, automotive equipment, aerospace equipment, and other microprocessor-based or consumer electronic devices. The invention can also be practiced in distributed computing environments where tasks are performed by remote processing devices that are linked through a communications network. In a distributed computing environment, program modules may be located in both local and remote memory storage devices.

With reference to FIG. 1, an exemplary system for implementing steps of the present invention in regard to a server or a client computing device includes a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output (BIOS) system 26, containing the basic routines that help to transfer information between elements within the PC 20, such as during start up, is stored in ROM 24.

The PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a CD-ROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer-readable media provide nonvolatile storage of computer-readable machine instructions, data structures, program modules, and other data for PC 20. Although the exemplary environment described herein employs a hard disk, a removable magnetic disk 29, and a removable optical disc 31, it will be appreciated by those skilled in the art that other types of computer-readable media, which can store data that are accessible by a computer, such as magnetic cassettes, flash memory cards, digital video discs, Bernoulli cartridges, random access memories (RAMs), ROMs, and the like, may also be used in the exemplary operating environment. A number of program modules may be stored on the hard disk, magnetic disk 29, optical disc 31, ROM 24 or RAM 25, including an operating system 35, one or more application programs 36, other program modules 37, and program data 38.

A user may enter commands and information into PC 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through I/O device interface 46 that is coupled to the system bus. The term I/O device interface is intended to encompass each interface specifically used for a serial port, a parallel port, a game port, a keyboard port, a PS/2 port, a USB port and/or other communication port. Similarly, a monitor 47 or other type of display device is also connected to system bus 23 via an appropriate interface, such as a video adapter 48, and is usable to display graphical user interfaces, Web pages, and/or other information. In addition to the monitor, PCs are often coupled to other peripheral output devices (not shown), such as speakers (through a sound card or other audio interface—not shown).

PC 20 may operate in a networked environment using logical connections to one or more remote sources, such as a remote computer 49. Remote computer 49 may be another PC, a server (which is typically generally configured much like PC 20), a router, a network PC, a peer device, a satellite, or other common network node, and typically includes many or all of the elements described above in connection with PC 20, although only an external memory storage device 50 has been illustrated in FIG. 1. In a networked environment, program modules depicted relative to PC 20, or portions thereof, may be stored in the remote external memory storage device. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54 or other means for establishing communications over WAN 52, such as the Internet. Modem 54, which may be internal or external, is typically coupled directly to the system bus via an internal slot, coupled to the bus via I/O device interface 46, or coupled to the bus via network interface 53. For example, modem 54 may be a broadband modem, such as an ADSL modem, that is coupled to the system bus via a USB interface. It will be appreciated that the network connections shown are exemplary and other means of establishing a communications link between the computers may be used, such as wireless communication and wide band network links.

Exemplary Implementation of the Present Invention

The following describes an exemplary implementation of a preferred embodiment for performing a virtual merge of one or more sets of updated data into an original ordered set of encyclopedia data, such as that provided in Microsoft Corporation's ENCARTA® encyclopedia database. It will be apparent that when updating the data originally included in the encyclopedia database, encyclopedia entries may be virtually added, deleted, or replaced with new information. However, it must be strongly emphasized that the present invention has application to many other types of databases and is generally applicable to any type of data that must be merged with one or more other sets of data.

Figure 2:
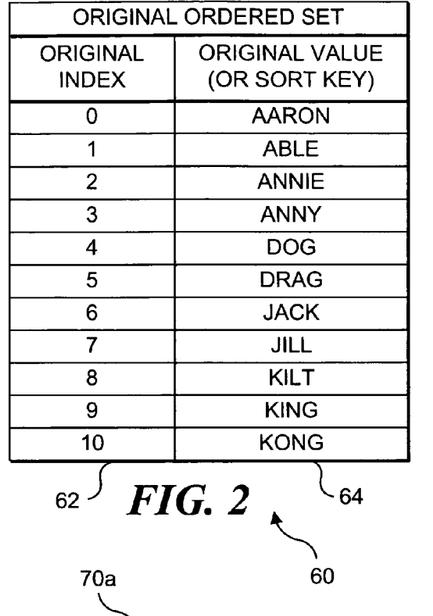
FIG. 2 is a data table illustrating an example original ordered set.

FIGS. 2–5 are data tables that illustrate how an original ordered set of data comprising a database is updated with added and deleted entries to form a dynamically ordered set. FIG. 2 is a data table illustrating an example original ordered set 60. As an ordered set of data entries, original ordered set 60 is assumed to be presorted in a desired order. For simplicity of discussion, original ordered set 60 is shown with only two columns. Those skilled in the art will recognize that more complex data structures will often be used. In this simplified example, a first column comprises an original index column 62 that defines a position of each data item associated with original ordered set 60. A second column comprises an original value column 64 that includes each actual data value (which is also a sort key for determining the order of the data in the original ordered set). Those skilled in the art will recognize that the value can be a direct sort key and/or a pointer to one or more pieces of data.

Updates to original ordered set 60 are defined by one or more other ordered sets. For example, a single exemplary update is defined by addition and deletion of several entities with regard to the original ordered set, as follows:

Add: DIG, DUG, and ZERO
Delete: ANNIE

Figures 3A, 4:
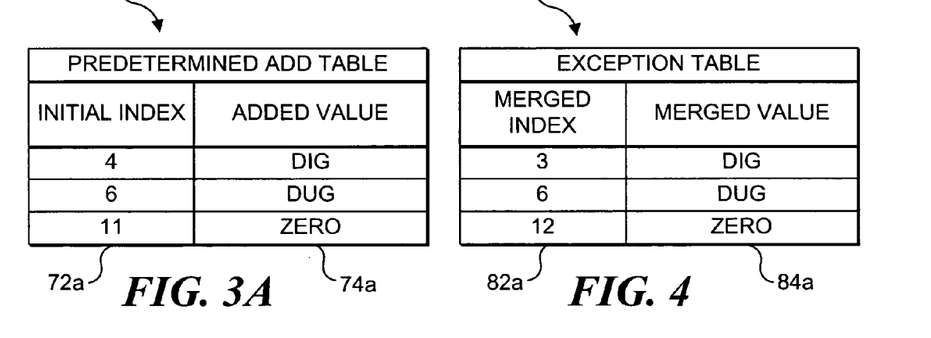
FIG. 3A is a data table illustrating an example of a predetermined add table.
FIG. 4 is a data table illustrating an example of a consolidated exception table.

Based on the desired update, corresponding predetermined ordered sets of the update data are created to implement the update. For instance, FIG. 3A is a data table illustrating an example of a predetermined add table 70a. Predetermined add table 70a preferably comprises the same data structure as original ordered set 60. In this specific example, predetermined add table 70a includes an initial index column 72a and an added value column 74a, just as in the structure of the original ordered set. The initial index for each added value in predetermined add table 70a corresponds to the original index that an added value would have if the added value was individually inserted into the original ordered set. Thus, each initial index is independently predetermined relative to the original ordered set—without regard for any other datum in the update data. For example, the added value "DIG" is assigned an initial index of "4," because that is the position "DIG" would occupy if it were physically merged into the original ordered set. Similarly, the added value "DUG" is assigned an initial index of "6," because that is the position "DUG" would occupy if it were physically merged into the original ordered set without having added "DIG" to the original ordered set. Thus, each initial index of predetermined add table 70a is assigned independently of any other entity in the predetermined add table.

Figure 3B:
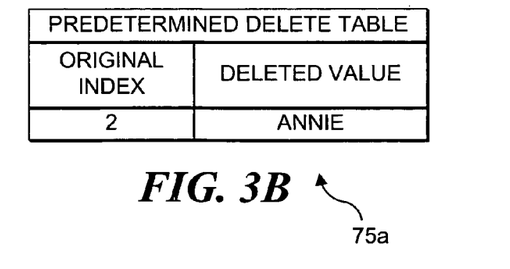
FIG. 3B is a data table illustrating an example of a predetermined delete table.

Analogously, deletions are defined relative to the original ordered set. FIG. 3B is a data table illustrating an example of a predetermined delete table 75a. In this simple example, the original index of a deleted entity is obtained directly from the original ordered set. However, if the deletion applies to an entity that was previously added, then the original index would be taken from the initial index column of the add table that added the entity.

From the predetermined add and delete tables, a consolidated table is created. FIG. 4 is a data table illustrating an example consolidated exception table 80a. Exception table 80a comprises a structure similar to that of the above tables However, exception table 80a has a merged index column 82a, instead of an initial index column, and a merged value column 84a, instead of the added value column 74a, to reflect that the added values in the exception table are now part of the final virtual database. The merged index for each merged value is determined relative to the additions and deletions defined by the corresponding predetermined add table(s) and predetermined delete table(s). For example, the merged value "DIG" is assigned a merged index of "3," because that is the position "DIG" would occupy if the deletion of "ANNIE" were taken into account in the original ordered set. Similarly, the merged value "DUG" maintains a merged index of "6," because that is the position "DUG" would occupy if the deletion of "ANNIE" and the addition of "DIG" before "DUG" were taken into account in the original ordered set. Thus, each merged index of exception table 80a is assigned relative to the additions and deletions defined by the predetermined add and delete tables.

Figure 5:
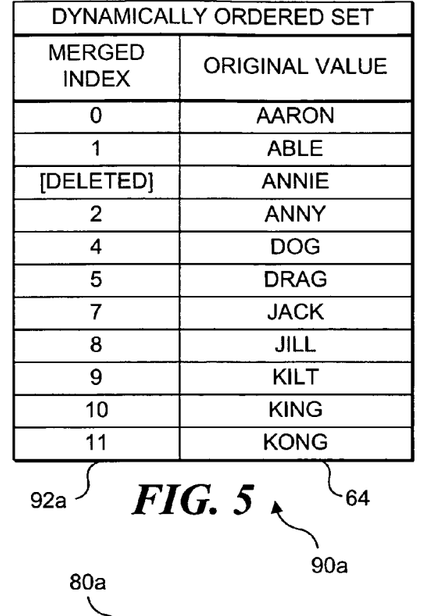
FIG. 5 is a data table illustrating an example of a dynamically ordered set.

Correspondingly, FIG. 5 is a data table illustrating an example dynamically ordered set 90a. Dynamically ordered set 90a is a modified version or subset of original ordered set 60. Specifically, the original indices of original index column 62 are modified to create a merged index column 92a that defines the relative position of the original values in regard to the merged values of exception table 80a. Note that a deleted entity, such as "ANNIE," may be represented by a negative merged index, a reserved merged index, or other indicator. In any case, dynamically ordered set 90a and exception table 80a together define a virtual database resulting from the update defined by predetermined add table 70a and predetermined delete table 75a.

Although this simple small example illustrates how the entire virtual database is produced, an important aspect of the present invention is that portions of a large virtual database can be determined dynamically without the need to determine merged indices for the entire ordered set. Specifically, merged indices for portions of the original ordered set can be determined on the fly as the virtual database is being accessed. Thus, the entire original ordered set does not have to be loaded into memory on the client and converted to a dynamically ordered set, and the merged indices do not have to be stored as an extra layer of metadata on the client. Dynamic determination of the merged indices is especially useful when different combinations of updates are selected. This aspect is discussed in greater detail below.

In a preferred embodiment, updates to a large original ordered set (such as the original encyclopedia database) can be downloaded to the client device from a server device. If one or more contiguous updates are to be downloaded and applied to the large original ordered set, an exception table can be preassembled on the server device and transmitted to the client device with the add and delete tables. For example, an exception table may be preassembled for users who wish to apply all available updates.

Figure 6:
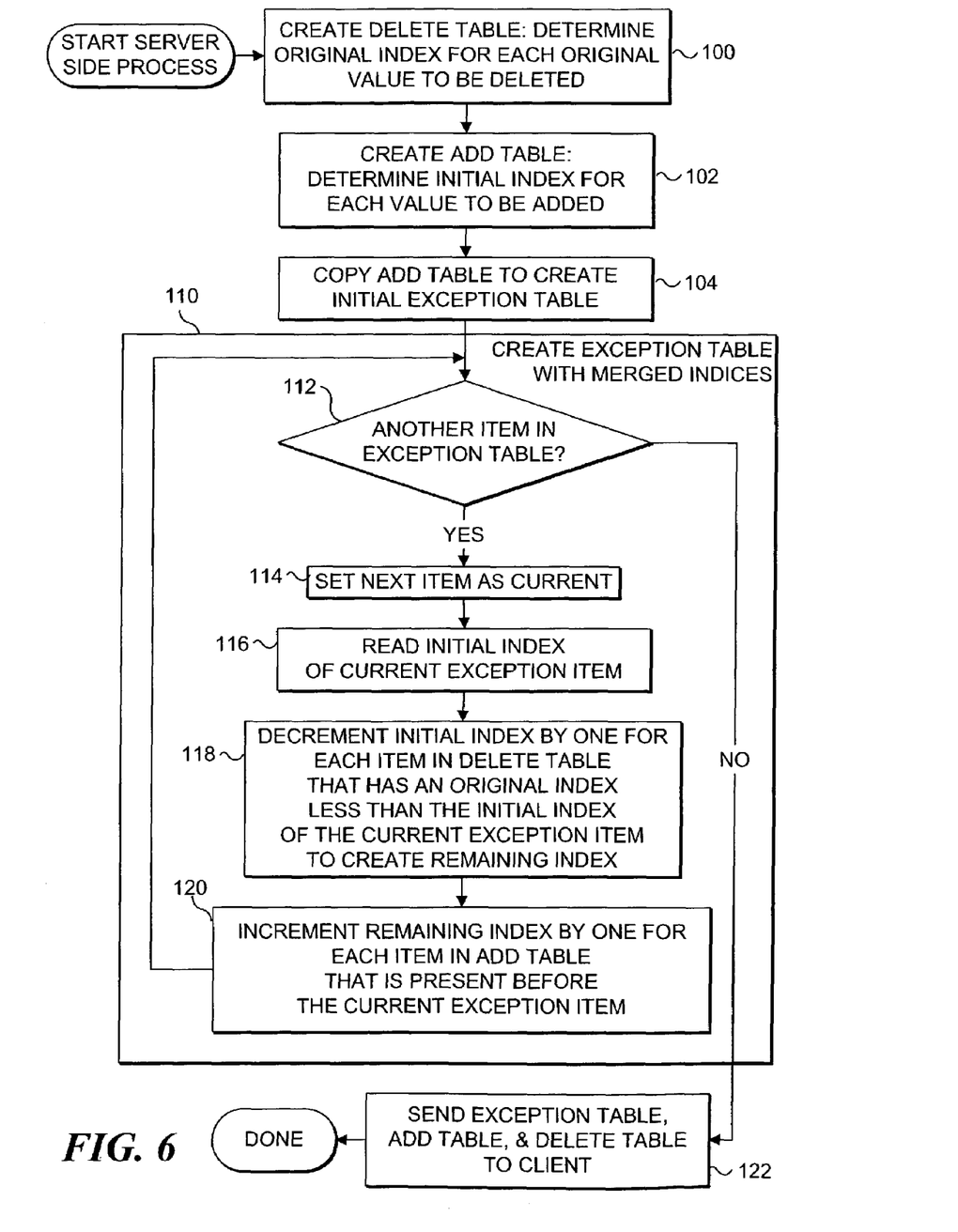
FIG. 6 is a flow diagram illustrating the logic used on a server to preassemble an exception table.

FIG. 6 is a flow diagram illustrating the logic employed on a server to preassemble an exception table. At a step 100, a delete table is created for all deletions to be made to the original ordered set. Multiple delete tables, corresponding to all available updates, may be combined into a single delete table. The combined delete table is sorted in the desired order (based on the sort key data) in preparation for later processing. As indicated above, the original index of each value to be deleted from the original ordered set is determined and placed in the delete table. Similarly, an add table is created, at a step 102, for all additions to be made to the original ordered set. Analogously, multiple add tables, corresponding to all available updates, may be combined into a single add table. The combined add table is also sorted in preparation for later processing. Again, an independent initial index is determined relative to the original ordered list for each added value in the add table.

At a step 104, the server copies the add table as a template for an initial exception table. Those skilled in the art will recognize that the exception table may be implemented in a number of alternate ways. For example, the server may simply append a copy of the initial index column to the existing add table, such that the appended column comprises the merged index column. In any case, the server then modifies the initial indices into merged indices at a step 110, as described in further detail below. Specifically, at a decision step 112, the server determines whether an entry exists in the exception table (i.e., whether the add table includes any added values to be virtually merged into the original ordered set). If no entries exist in the exception table, the update comprises only deletions. Deletions can be accomplished by the client device with only the delete table. However, if the exception table includes at least one entry (i.e., because there is at least one added value), the server increments from zero to the "next" entry in the exception table, at a step 114, which sets the first added value as a current exception item. The server reads the initial index of the current exception item, at a step 116, as copied from the add table.

At a step 118, the server determines the number of items in the delete table that have an original index less than the initial index of the current exception item. The server then decrements the initial index of the current exception item by this determined number. The remaining index comprises a temporary intermediate index at this point. Those skilled in the art will recognize that step 118 may be skipped if there is no delete table. In an analogous fashion, at a step 120, the server determines the number of items in the add table that occur in the sorted order before the current exception item. Since the exception table is initially copied from the add table, the server may alternatively determine the number of items that occur before the current exception item in the exception table. The server then increments the remaining index of the current exception item by this second determined number to define the merged index of the current exception item. Those skilled in the art will recognize that steps 118 and 120 can be interchanged and modified to achieve the same result.

After defining the merged index, control returns to decision step 112 to determine if another item is to be processed in the exception table. Once a merged index is defined for each merged value in the exception table, the server can save the exception table for download to any client device whose user wishes to apply all the contiguous updates defined by the add and delete tables. In that case, the server preferably communicates the exception table, the add table, and the delete table to the client device, at a step 122. Predetermining and saving the tables on the server for download is especially beneficial for large updates, and improves response time by enabling users to quickly download the tables when needed. As discussed below, if the server determines the exception table, the client can process the exception table in such a way that the add table is not needed. Alternatively, the client device can determine the exception table itself using only the add table and the delete table received from the server. However, client processing may be easier and/or quicker using a downloaded add table in addition to a downloaded exception table.

Figure 7:
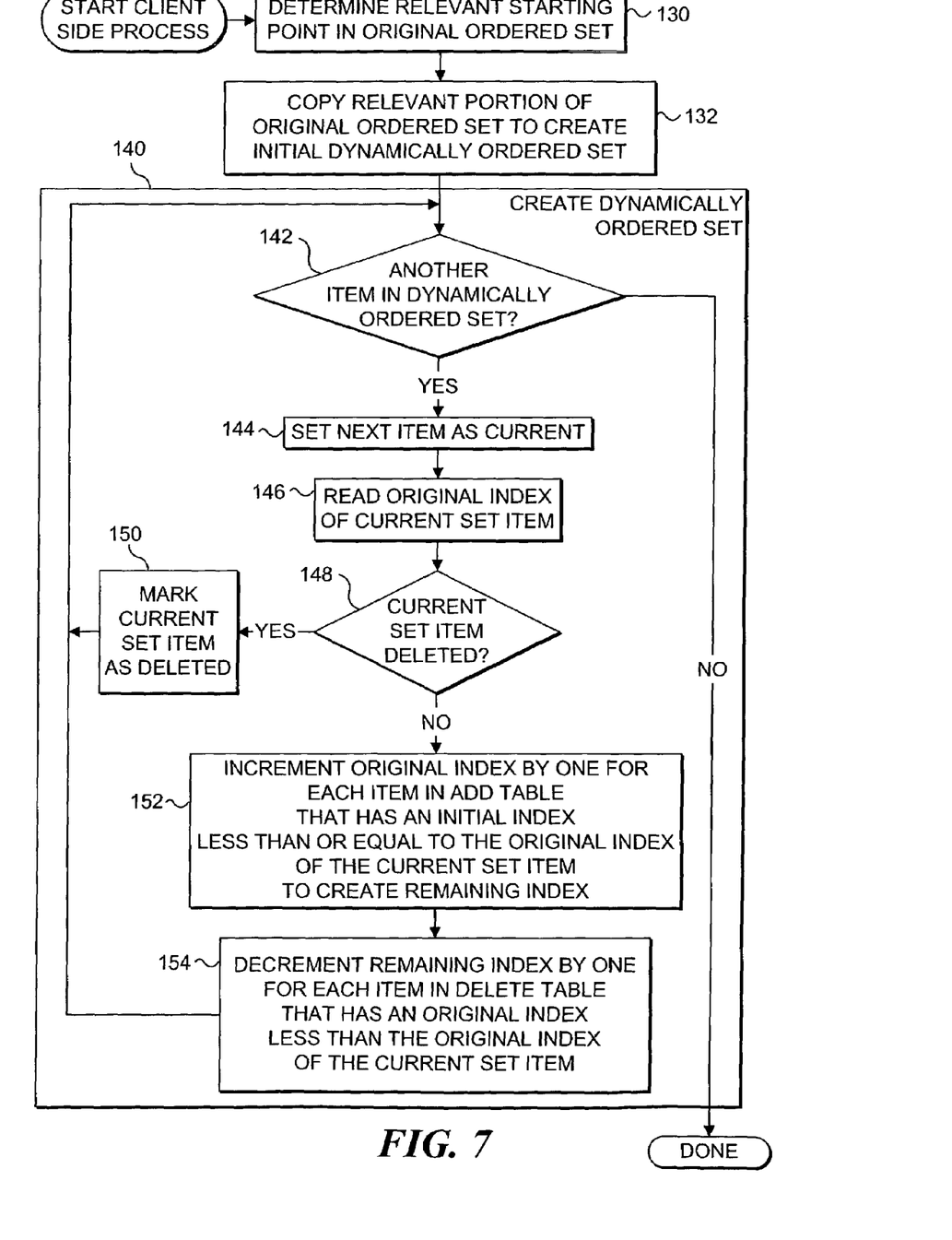
FIG. 7 is a flow diagram illustrating the logic used on a client to determine merged indices for the dynamically ordered set.

FIG. 7 is a flow diagram illustrating logic for a client to determine merged indices for the dynamically ordered set. As indicated above, the client need not update the entire original ordered set into a complete dynamically ordered set. Instead, the following calculations can be performed dynamically in regard to a portion of the original ordered set to improve the response time in presenting a desired portion of the virtually merged database. Alternatively, the original ordered set may already represent a subset of the large database stored on the client. Although the client could perform a one-time update of the entire original ordered set (or the entire large database) into a dynamically ordered set, this update may be a lengthy process for a very large original ordered set, such as a large encyclopedia database. Frequent updates would also require frequent lengthy processing of the large original ordered set. The time required to update the database in this manner would be undesirably long. Thus, dynamic determination of merged indices enables fast virtual updates to the original ordered set of data, and fast incorporation of frequent updates. This aspect will be better understood in light of the following discussion regarding determining a portion of the virtually merged database, as shown by the logic of FIG. 7.

At a step 130, the client device determines a relevant starting point in the original ordered set, such as a search starting point. For instance, a user may be interested in finding an encyclopedia entry that starts with a certain letter of the alphabet, such as the letter "D." Based on the selected starting point to browse entries in the database, the client device finds the corresponding point in the original ordered set and copies a relevant portion, at a step 132, to use as an initial dynamically ordered set. Those skilled in the art will recognize that the client need not copy all of the data of the relevant portion of the original ordered set into memory to enable the user to browse the data. The client may simply copy the relevant original indices and corresponding original values (e.g., sort keys). The client then creates the dynamically ordered set, at a step 140, as described in further detail below.

Specifically, the client determines, at a decision step 142, whether an original value exists in the initial dynamically ordered set (i.e., whether the copied portion of the original ordered set includes any original values to be virtually merged with the exception table). If no original values exist in the initial dynamically ordered set, the client will check the exception table for any entries that match the search criteria and immediately use those entries. However, if the initial dynamically ordered set includes at least one original value matching the search criteria, the client increments from zero to a "next" item in the initial dynamically ordered set, at a step 144, which sets the first original value as a current set item. At a step 146, the client reads the original index of the current set item in the initial dynamically ordered set, as copied from the original ordered set.

At a decision step 148, the client checks the delete table for the original index of the current set item to determine whether the current set item should be deleted. If the delete table includes the original index of the current set item, indicating that the current set item should be deleted, the client marks the current set item as deleted, at a step 150. The mark could be implemented in the dynamically ordered set as a negative merged index, as a reserved character for the merged index, or with some other appropriate (predefined) indication. Control then returns to decision step 142 to process another item in the initial dynamically ordered set.

However, if the current set item is not deleted, the client determines the number of items in the add table that have an initial index that is less than or equal to the original index of the current set item. Since the exception table is copied from the add table, the client may alternatively determine the number of items in the exception table that occur before the current set item (e.g., the number of merged values, when sorted, that would be found before the original value of the current set item). This second technique is useful if only the exception table and the delete table were provided to the client and requires comparing the value of exception table items to the original value of the current set item. Value comparisons may take slightly longer than a simple numerical comparison of indices, but the additional time might be acceptable if it offsets the download time of the add table. In any case, the client then increments the original index of the current set item by the number thus determined, at a step 152, to define an intermediate remaining index of the current set item in the dynamically ordered set.

Similarly, at a step 154, the client determines the number of items in the delete table that have an original index less than the original index of the current set item. Note that the client uses the original index of the current set item for this determination, and not the remaining index. Alternatively, the client could perform a value comparison with the delete items, similar to the value comparison that is possible with the exception table. However, a value comparison with the delete items is likely less efficient than using the original indices of the delete table, and does not eliminate the need to download the delete table. In any case, the client then decrements the remaining index of the current set item by this determined number of delete items to define the merged index of the current set item. Those skilled in the art will recognize that steps 152 and 154 may be easily interchanged and modified to achieve the same result.

After defining the merged index of the current set item, control returns to decision step 142 to determine if another item is to be processed for the dynamically ordered set. The process of step 140 can be repeated to create merged indices for a predetermined portion of the dynamically ordered set, creating batches of merged indices, which may provide efficient processing or buffering of the data. Alternatively, immediately upon defining a merged index for an item in the dynamically ordered set, the client can start to display the resulting virtually merged item to the user. In either case, the process is dynamic, producing a moving window of the virtually merged database as the client browses through the data.

The invention can also virtually merge selected, noncontiguous updates. For example, a user may not wish to apply all updates to the original ordered set, and instead may wish to selectively apply only certain updates that appear relevant to the user. In this case, the virtual merge of updates into the original ordered set can be performed in a manner similar to that described above, but the exception table cannot be predefined. The add and delete tables for each separate update can be predefined, but a combined add table and a combined delete table cannot be created until the user has selected the desired updates. Similarly, the exception table can only be created once the user has selected the desired updates.

FIGS. 8A–10 are data tables that illustrate how an original ordered set is updated on the client with multiple, noncontiguous add and delete tables. FIG. 2, illustrating example original ordered set 60, is reprinted for clarity in relation to FIGS. 8A–10. In this example, a second update is selected along with the first update described above. Specifically, the following two updates are selected by a user:

First Update (same as above):
    Add: DIG, DUG, and ZERO
    Delete: ANNIE
Second Update:
    Add: DYLE
    Delete: DOG For the first update, the above predetermined add table 70a and predetermined delete table 75a are already available. Similarly, a second add table and a second delete table could be predefined for the second update. Other predefined add tables and other predefined delete tables could also be created for any other available updates. However, because the above two updates are selected by the user from among others that are available, a combined add table, a combined delete table, and a consolidated exception table must be created after the user selection.

Figure 8A:
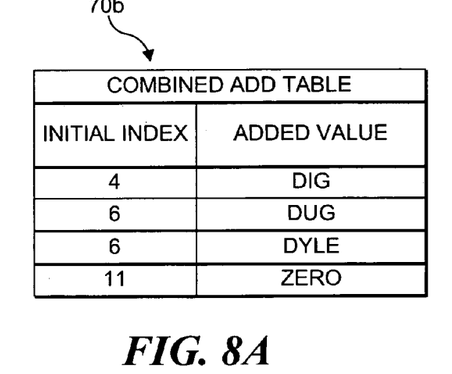
FIG. 8A is a data table illustrating an example of a combined add table.
Figure 8B:
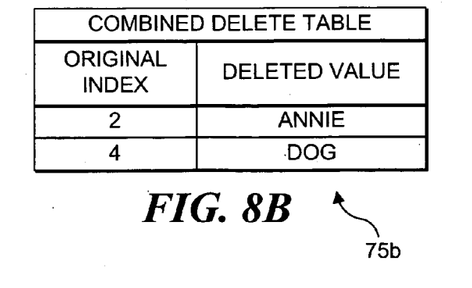
FIG. 8B is a data table illustrating an example of a combined delete table.

FIG. 8A is a data table illustrating an example of a combined add table 70b. As with the predetermined tables discussed above, combined add table 70b has the same structure as original ordered set 60. Also, as above, the initial index for each added value in combined add table 70b is independently determined relative to the original ordered set. For example, the added value "DYLE" is assigned an initial index of "6," because that is the position "DYLE" would occupy if it were physically merged into the original ordered set without having added "DIG" or "DUG." The process of assigning an initial index is also a de facto sort of the items from the selected updates. Analogously, combined deletions are defined relative to the original ordered set. FIG. 8B is a data table illustrating an example of a combined delete table 75b. As above, the original index of the deleted entity is taken directly from the original ordered set unless the deleted entity was previously added by one of the updates.

The combined add table and combined delete table may be created on the server after the user selects the desired updates. Alternatively, only the add tables and delete tables corresponding to the selected updates can be downloaded, and the client can then create the combined add table and the combined delete table. As another alternative, each of the individual predetermined add tables and delete tables may be downloaded to the client as each update becomes available since the last time the client connected to the server. If predetermined add and predetermined delete tables are downloaded to the client, the client can immediately create the corresponding combined add table and combined delete table, upon selecting the desired updates. The trade-off is that the client device must store all of the predetermined add and predetermined delete tables. In any case, once the combined add table and the combined delete table are created, a consolidated exception table is created. The consolidated exception table can also be created by either the server or the client. Since predetermined or combined add and delete tables must be downloaded anyway, it is likely more efficient to have the client create the consolidated exception table to eliminate the wait time required to create and transmit the consolidated exception table. Further details of an exemplary preferred embodiment are discussed below with regard to FIGS. 11 and 12.

Figure 9:
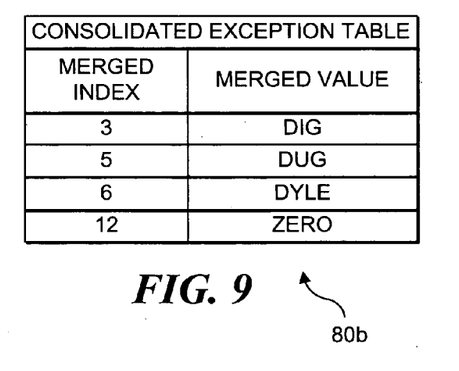
FIG. 9 is a data table illustrating an example of a consolidated exception table.

FIG. 9 is a data table illustrating an example consolidated exception table 80b. The merged index for each merged value is determined relative to the additions and deletions defined by the combined add table and combined delete table. For example, the merged value "DUG" is assigned a merged index of "5," because that is the position "DUG" would occupy if the deletion of "ANNIE" and "DOG" were taken into account from the original ordered set.

Figure 10:
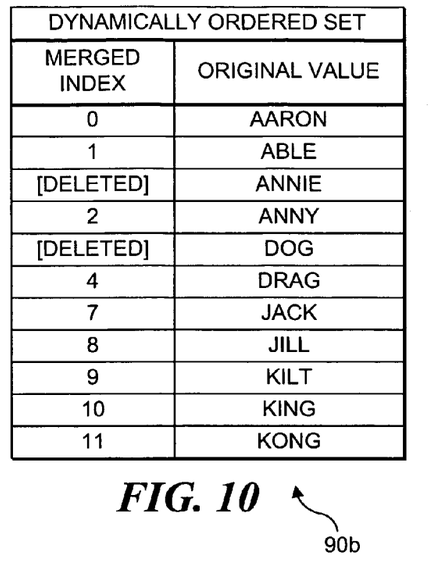
FIG. 10 is a data table illustrating an example of a dynamically ordered set resulting from processing the combined add table and the combined delete table.

Correspondingly, FIG. 10 is a data table illustrating an example dynamically ordered set 90b resulting from processing the combined add table and the combined delete table. Dynamically ordered set 90b and exception table 80b together define a virtual database resulting from the selected updates defined by combined add table 70b and combined delete table 75b. Further details of the process leading to creation of these tables is discussed below.

Figure 11:
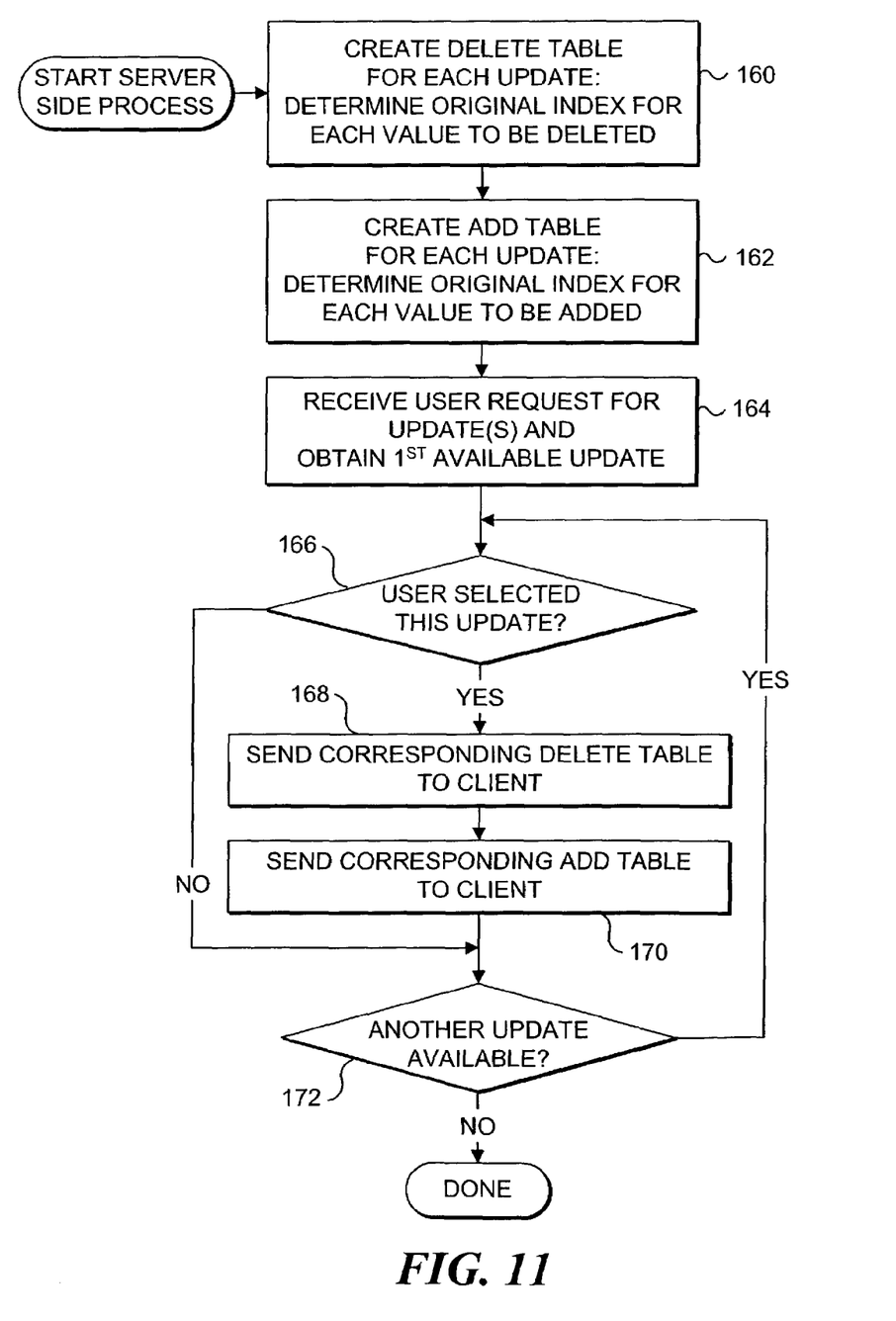
FIG. 11 is a flow diagram illustrating the logic used on the server to provide selected predetermined add tables and predetermined delete tables to the client for creating the combined add table, combined delete table, and consolidated exception table.

FIG. 11 is a flow diagram illustrating the logic used by the server to provide selected predetermined add tables and selected predetermined delete tables to the client for creating the combined add table, combined delete table, and consolidated exception table. At a step 160, the server creates a predetermined delete table corresponding to each update. This step is preferably performed as part of releasing a new update, and preferably occurs well before a virtual merge is desired, i.e., before the client connects to the server to download the update. Step 160 essentially corresponds to iterating step 100 of FIG. 6 as each update becomes available. Recall that a predetermined delete table includes the original index of each value to be deleted. Similarly, at a step 162 of FIG. 11, the server creates a predetermined add table corresponding to each update. This step essentially comprises iterating step 102 of FIG. 6 as each update becomes available. Again, a predetermined add table includes an initial index for each value to be added. Recall also that the predetermined tables preferably have the same structure as the original ordered set with at least an index column and a value column (i.e., the tables comprise homogeneous ordered sets).

At a step 164 of FIG. 11, the server receives a user request for selected updates. The server then accesses the predetermined add and delete tables associated with the first available update. At a decision step 166, the server determines whether the user selected the first available update. If the user selected the first available update, and if a predetermined delete table exists for the first available update, the server transmits the corresponding predetermined delete table to the client, at a step 168. Similarly, the server transmits the corresponding predetermined add table to the client, at a step 170, if a predetermined add table exists for the first available update. Once the first predetermined tables are transmitted, or if the user did not select the first available update, the server determines, at a decision step 172, whether another update is available. If another update is available, control returns to decision step 166 to determine if the user selected the next available update and to send the corresponding predetermined tables. As indicated above, all of the predetermined add and delete tables could be transmitted to the client, and the client could perform the above selection process. Either the server or the client can combine tables and create a consolidated exception table. In the following discussion of one example, the client performs these operations.

Figure 12:
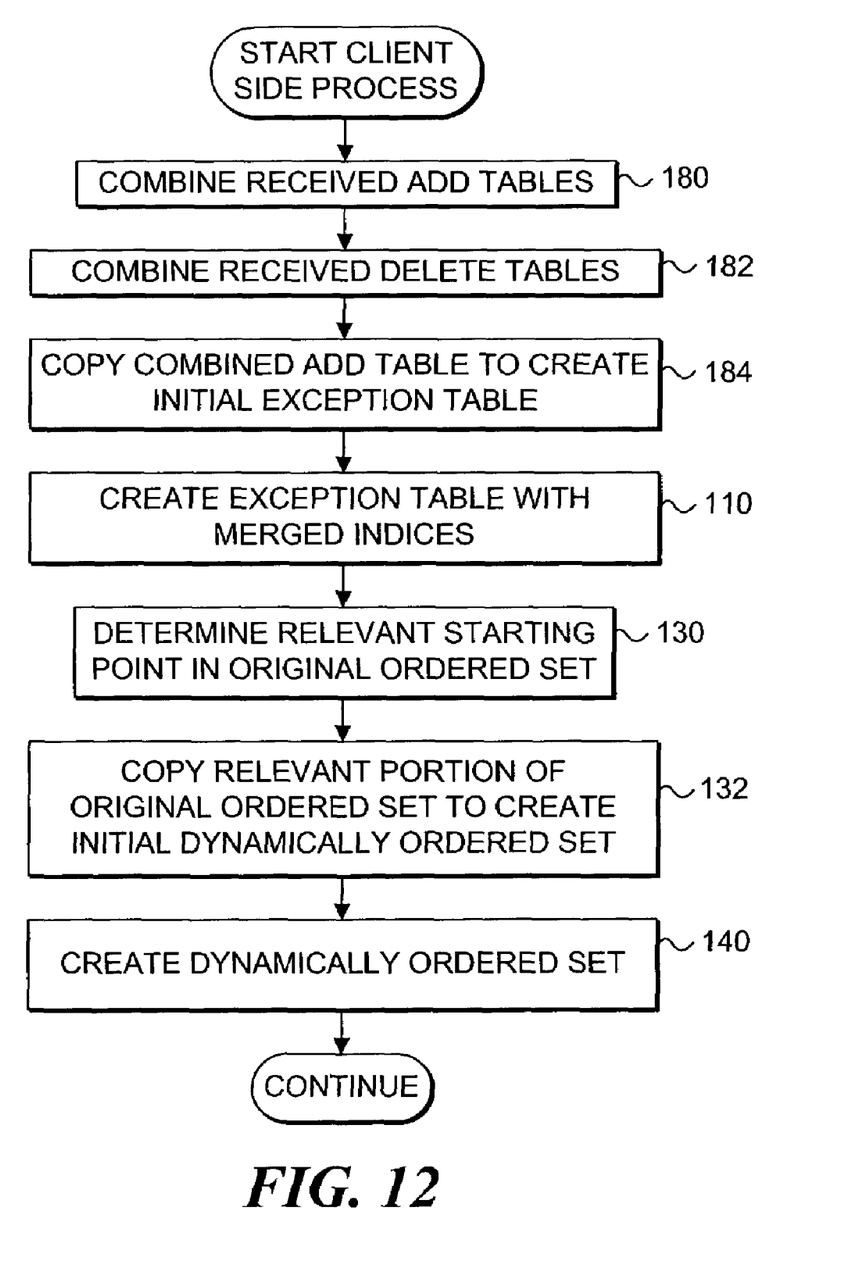
FIG. 12 is a flow diagram illustrating the logic used by the client to create a consolidated exception table and a dynamically ordered set.

FIG. 12 is a flow diagram illustrating the logic used by the client to create a consolidated exception table and a dynamically ordered set. At a step 180, the client appends and sorts the received predetermined add tables to produce a combined add table. Similarly, at a step 182, the client appends and sorts the predetermined delete tables received into a combined delete table. The client then copies the combined add table to begin creating an exception table, at a step 184. Using the combined add table and combined delete table, the client determines merged indices for a consolidated exception table, according to the process of step 110, which was discussed in detail above in regard to FIG. 6.

With the consolidated exception table defined, the client can dynamically create a dynamically ordered set from that part of the original ordered set relevant to the user's current query or browse starting point. Thus, when the user requests desired data, the client dynamically determines a relevant starting point in the original ordered set, at step 130, as introduced in the discussion of FIG. 7. Correspondingly, the client copies a relevant portion of the original ordered set to create an initial dynamically ordered set, at step 132. The relevant portion may comprise a single original item, a predefined amount of data from the original ordered set beyond the relevant starting point, or may be determined in other known ways. Preferably, the selected amount of data serves as a buffered moving window of data as the user navigates through the database. Having established a relevant portion of the original ordered set, the client determines the merged indices for the dynamically ordered set according to the process of step 140, as discussed in regard to the steps of FIG. 7. With a dynamically ordered set and an exception table, the user can access a moving window of the virtually merged database.

Figure 13:
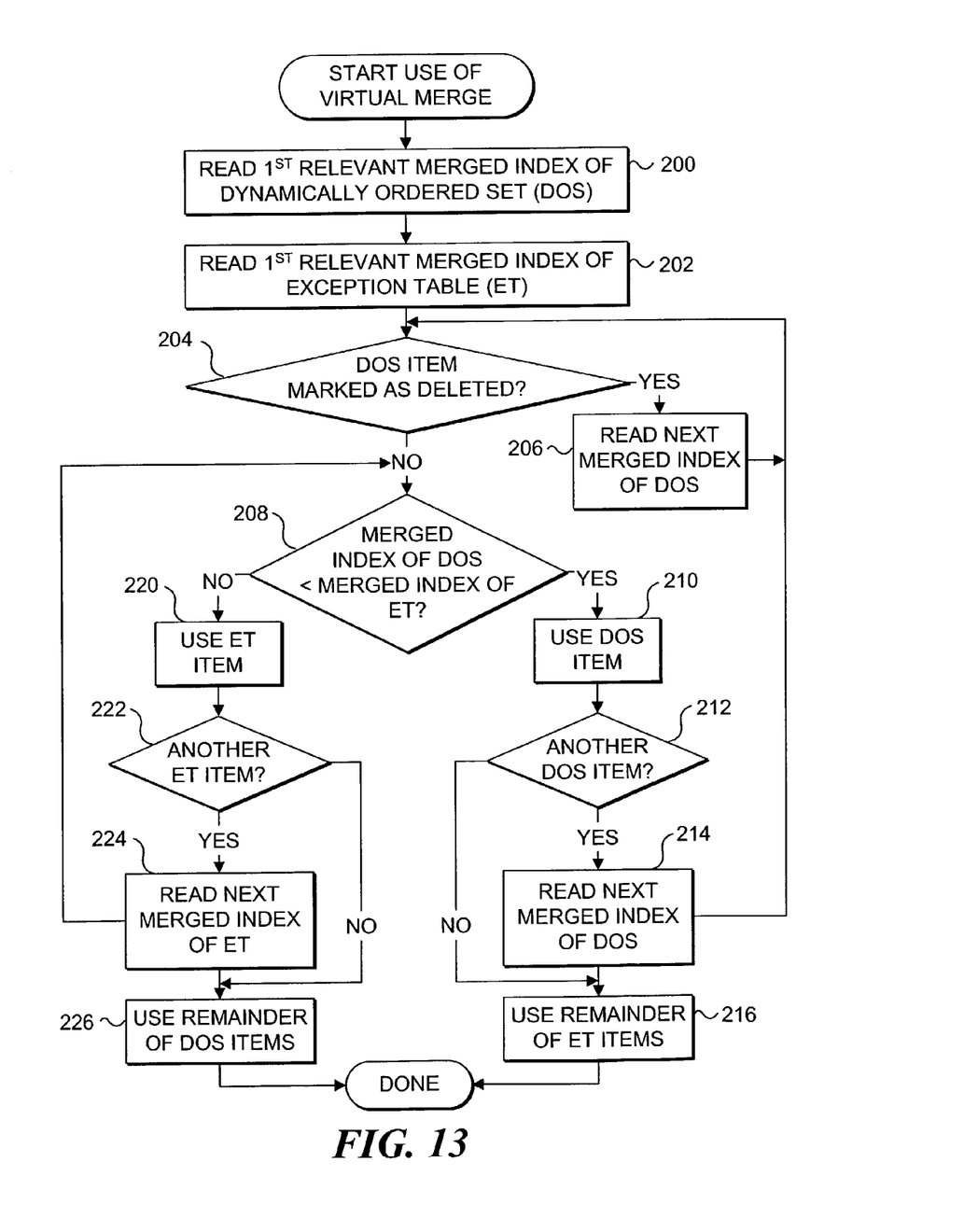
FIG. 13 is a flow diagram illustrating the logic for selecting data from the dynamically ordered set and exception table in the sequence of a virtually merged database.

FIG. 13 is a flow diagram illustrating logic for selecting data using a dynamically ordered set and an exception table in the sequence of a virtually merged database. This logic applies equally to a contiguous set of updates or selected updates. At a step 200, the client reads the first merged index of that portion of the dynamically ordered set identified by the relevant starting point. The first item of this portion of the dynamically ordered set is thus initially used as a current item of the dynamically ordered set. As noted above, step 200 can alternatively comprise one pass through the logic of step 140 in FIG. 7. In that case, the client can dynamically process one original item at a time to determine the merged index of the original item and use that merged index in the comparison described below. Nevertheless, because the dynamically ordered set is, by definition, ordered, the first merged index corresponds to the smallest merged index of that portion of the dynamically ordered set identified by the relevant starting point. Recall, however, that the relevant starting point may actually correspond to one of the merged indices of the exception table. Thus, the client also reads the first merged index of the exception table that corresponds to the relevant starting point, at a step 202. This first item of the exception table is initially used as the current item of the exception table.

At a decision step 204, the client determines whether the first relevant merged index of the dynamically ordered set represents a deleted item. If the item is marked as deleted, the client reads the next merged index of the dynamically ordered set, at a step 206. Control then returns to decision step 204 to check whether the next merged index represents another deleted item. Once a non-deleted item is identified, the client determines, at a decision step 208, whether the merged index of the current item in the dynamically ordered set is less than the merged index of the current item in the exception table. If so, the current item in the dynamically ordered set must be positioned ahead of the current item in the exception table. This comparison thus determines the order of the items in the virtual database as defined by the dynamically ordered set and the exception table. When the current item of the dynamically ordered set is ahead of the current item of the exception table, the client uses the current item of the dynamically ordered set, at a step 210. Use of the current item in this exemplary application of the present invention to an encyclopedia database may include displaying the encyclopedia data associated with the item, inputting the current item to another process, copying the current item, or other use of the data.

Once an item is used, the client prepares for the next comparison of merged indices. For instance, at a decision step 212, the client determines whether another item exists in the dynamically ordered set. If another item exists in the dynamically ordered set, the client reads the next merged index of the next item in the dynamically ordered set, at a step 214. Control then returns to decision step 204 to determine whether the next item of the dynamically ordered set is marked as deleted, and subsequently to compare merged indices. However, if the client has reached the end of the dynamically ordered set (or that portion of the dynamically ordered set currently being used), the client can use the current item of the exception table that was used for the comparison at decision step 208, and use the remainder of the items in the exception table (or that portion of the exception table encompassed by the portion of the dynamically ordered set this is currently being used), at a step 216.

Conversely, if the merged index of the current item in the exception table is less than the merged index of the current item in the dynamically ordered set, the client uses the current item of the exception table, at a step 220. As above, once an item is used, the client prepares for the next comparison of merged indices. In this case, at a decision step 222, the client determines whether another item exists in the exception table. If so, the client reads the next merged index of the next item in the exception table, at a step 224. Control then returns to decision step 208 to compare merged indices. However, if the client has reached the end of the exception table (or that portion of the exception table currently being used), the client can use the current item of the dynamically ordered set that was used for the comparison, at decision step 208, and use the remainder of the items in the dynamically ordered set, at a step 226 (or that portion of the exception table encompassed by the portion of the dynamically ordered set this is currently being used).

Although the present invention has been described in connection with the preferred form of practicing it, those of ordinary skill in the art will understand that many modifications can be made thereto within the scope of the claims that follow. For example, updates to existing items in an original ordered set can be accomplished by processing a deletion followed by an addition. Accordingly, it is not intended that the scope of the invention in any way be limited by the above description, but instead be determined entirely by reference to the claims that follow.

The invention in which an exclusive right is claimed is defined by the following:

1. A computing device-implemented method for virtually merging an original ordered set and a new ordered set in a computing device, wherein the original ordered set and the new ordered set have homogeneous data structures, comprising the steps of:
   (a) for each original item of the original ordered set, assigning an original index indicating a sort order of the original item in the original ordered set as a function of an original value of the original item in the original ordered set;
   (b) for each new item of the new ordered set, determining an initial index defining a sort order for the new item in the original ordered set as a function of a corresponding new value of the new item in the new ordered set relative to the original value of each original item in the original ordered set;

(c) for each new item of the new ordered set, incrementing the initial index by a number of items in the new ordered set having a sort order prior to the new item in the new ordered set, thereby creating a new merged index, wherein a resulting collection of new merged indices and corresponding new values defines an exception table; and (d) for at least one original item of the original ordered set, incrementing the original index by a number of new items in one of the new ordered set and the exception table, where the new items have a sort order prior to the original item, thereby creating an original merged index, a resulting collection of original merged indices and corresponding original values defining a dynamically ordered set, the exception table and the dynamically ordered set together defining a virtual merger of the original ordered set and the new ordered set.

2. The method of claim 1, wherein steps (a) and (b) are performed by a first computing device, and at least step (d) is performed by a second computing device.

3. The method of claim 1, further comprising the steps of:
(a) for each original item to be deleted from the original ordered set, determining an original delete index corresponding to the original index of the original item to be deleted, wherein a resulting collection of original delete indices defines a delete table;
(b) for each new item of the exception table, decrementing the new merged index by a number of delete items in the delete table having an original delete index less than the initial index of the new item; and
(c) for each original item of the dynamically ordered set, decrementing the original merged index by a number of items in the delete table having an original delete index less than the original index of the original item.

4. The method of claim 3, further comprising the step of, for each original item to be deleted from the original ordered set, providing an indication in the dynamically ordered set indicating the original item is deleted.

5. The method of claim 3, wherein at least step (a) of claim 3 is performed by a first computing device, and at least step (c) of claim 3 is performed by a second computing device.

6. The method of claim 1, wherein the step of determining the initial index comprises the step of predetermining the initial index for each of a plurality of updates to the original ordered set.

7. The method of claim 1, wherein the step of incrementing the initial index is performed:
(a) after the initial index is determined, if the new ordered set represents a contiguous collection of updates to the original ordered set; and
(b) upon selection of a combination of non contiguous updates to the original ordered set, if the new ordered set represents a combination of non contiguous updates.

8. The method of claim 1, wherein the original value corresponds to one of:
(a) a sort key for the original ordered set; and
(b) a pointer to data associated with the original value.

9. The method of claim 1, wherein the new value corresponds to one of:
(a) a sort key for the new ordered set; and
(b) a pointer to data associated with the new value.

10. The method of claim 1, wherein the step of incrementing the original index comprises one of the steps of:
(a) incrementing the original index by a number of items in the new ordered set having an initial index less than or equal to the original index; and
(b) incrementing the original index by a number of items in one of the new ordered set and the exception table occurring prior to the original item, as a function of the new value.

11. The method of claim 1, wherein the at least one original item is determined as a function of one of a query and a browse, further comprising the steps of:
(a) determining a selected new item from the exception table as a function of one of the query and the browse;
(b) determining whether the original merged index is less than a new merged index of the selected new item;
(c) using the original item in a subsequent operation if the original merged index is less than the new merged index of the selected new item; and otherwise,
(d) using the selected new item in a subsequent operation.

12. A memory medium having machine instructions stored thereon for carrying out the steps of claim 1.

13. A system for enabling an original ordered set to be virtually merged with a new ordered set by a remote computing device, wherein the original ordered set and the new ordered set have homogeneous data structures, and wherein the new ordered set comprises one or more updates of the original ordered set, comprising:
(a) a network interface, adapted to couple in communication with the remote computing device;
(b) a processor in communication with the network interface;
(c) a memory in communication with the processor and storing machine instructions, said machine instructions causing the processor to carry out a plurality of functions, including:
(i) for each original item of the original ordered set, assigning an original index defining a sort order of the original item in the original ordered set as a function of a corresponding original value of the original item in the original ordered set, producing a predetermined original ordered set;
(ii) providing the predetermined original ordered set to the remote computing device;
(iii) for each new item of the new ordered set, determining an initial index defining a position order the new item would take in the original ordered set as a function of a corresponding new value of the new item in the new ordered set relative to each original value of each original item in the original ordered set, producing an add table;
(iv) receiving a request from the remote computing device for selected updates, and if the selected updates comprise all updates to the original ordered set, for each new item of the new ordered set, incrementing the initial index by a number of items in the new ordered set having a sort order prior to the new item in the new ordered set, thereby creating a new merged index, wherein a resulting collection of new merged indices and corresponding new values defines an exception table; and
(v) in response to the request received from the remote computing device, transferring at least one of the add table and the exception table to the remote computing device, for use by said remote computing device in virtually merging the new ordered set with the predetermined original ordered set.

14. The system of claim 13, wherein for each original item to be deleted from the original ordered set, the machine instructions further cause the processor to determine an original delete index corresponding to the original index of the original item to be deleted, wherein a resulting collection of original delete indices defines a delete table, said delete table also being transferred to the remote computing device in response to the request.

15. The system of claim 14, wherein the machine instructions further cause the processor to predetermine the original delete indices for the delete table for a plurality of updates.

16. The system of claim 13, wherein the machine instructions further cause the processor to predetermine the initial index for each of a plurality of updates to the original ordered set.

17. The system of claim 13, in response to the request from the remote computing device, the machine instructions further cause the processor to select and transfer at least one of a plurality of new ordered sets for use by said remote computing device in creating a combined new ordered set.

18. A system for virtually merging an original ordered set with a new ordered set, wherein the original ordered set and the new ordered set have homogeneous data structures, and wherein the new ordered set comprises an update of the original ordered set, comprising:
  (a) a network interface, adapted to couple in communication with a server device;
  (b) a processor in communication with the network interface;
  (c) a memory in communication with the processor and storing machine instructions, said machine instructions causing the processor to carry out a plurality of functions, including:
    (i) accessing the original ordered set, wherein for each original item of the original ordered set, an original index defines a sort order of the original item in the original ordered set as a function of a corresponding original value of the original item in the original ordered set;
    (ii) receiving the new ordered set, wherein for each new item of the new ordered set, an initial index has been provided defining a sort order the new item would take in the original ordered set as a function of a corresponding new value of the new item in the new ordered set relative to each original value of each original item in the original ordered set, said new ordered set including at least one of an add table and an exception table;
    (iii) for at least one original item of the original ordered set, incrementing the original index by a number of new items in the new ordered set having a sort order prior to the original item, thereby creating an original merged index, for defining a virtual merger of the original ordered set and the new ordered set; and
    (iv) wherein for each new item of the new ordered set, a new merged index has been defined by incrementing the initial index by a number of items in the new ordered set having a sort order prior to the new item in the new ordered set, a resulting collection of new merged indices and corresponding new values defining the exception table.

19. The system of claim 18, wherein the machine instruction further cause the processor to carry out the functions of:
  (a) receiving a delete table, wherein for each original item to be deleted from the original ordered set, an original delete index corresponding to the original index of the original item to be deleted has been determined;
  (b) for each new item of the exception table, decrementing the new merged index by a number of delete items in the delete table having an original delete index less than the initial index of the new item; and
  (c) for each original item of the dynamically ordered set, decrementing the original merged index by a number of items in the delete table having an original delete index less than the original index of the original item.

20. The system of claim 18, wherein the machine instruction further cause the processor to carry out the functions of:
  (a) receiving an additional new ordered set, wherein for each additional new item of the additional new ordered set, an initial index defining a sort order the additional new item would take in the original ordered set has been predetermined as a function of a corresponding new value of the additional new item relative to each original value of each original item in the original ordered set; and
  (b) combining the new ordered set with the additional new ordered set, producing a combined new ordered set to be processed as the new ordered set to create the exception table and dynamically ordered set.

21. The system of claim 18, further comprising an input device, wherein the machine instruction further cause the processor to carry out the functions of:
  (a) determining the at least one original item as a function of one of a query and a browse entered by a user;
  (b) determining a selected new item from the exception table as a function of one of the query and the browse;
  (c) determining whether the original merged index is less than a new merged index of the selected new item;
  (d) using the original item in a subsequent operation if the original merged index is less than the new merged index of the selected new item; and otherwise,
  (e) using the selected new item in a subsequent operation.

22. A computing device-implemented method for creating a virtual database comprising the steps of:
  (a) defining an original ordered set comprising at least one original index and at least one corresponding original sort key;
  (b) creating an add table for at least one update to the original ordered set, wherein the add table comprises at least one initial index and at least one corresponding initial sort key, and wherein the at least one initial index defines a position order the at least one initial sort key would take in the original ordered set relative to the at least one original sort key in the original ordered set;
  (c) creating an exception table from the add table by incrementing the at least one initial index for each additional sort key occurring prior to the at least one initial sort key in the add table; and
  (d) creating a dynamically ordered set from the original ordered set by incrementing the at least one original index for each initial index less than the at least one original index, the dynamically ordered set and the exception table together defining the virtual database.

23. The method of claim 22, wherein steps (a) and (b) are performed by a first computing device, and at least step (d) is performed by a second computing device.

24. The method of claim 22, wherein the step of creating a merged ordered step comprises the steps of:
  (a) determining a starting location within the original ordered set;
  (b) selecting a subset of the original ordered set as a function of the starting location, wherein the subset comprises a portion of the at least one original index and the at least one corresponding original sort key; and (c) creating the dynamically ordered set from the subset by incrementing the at least one original index for each initial index less than the at least one original index.

25. A computing device-implemented method for virtually merging an original ordered set and a new ordered set, wherein the original ordered set and the new ordered set comprise homogeneous data structures, comprising the steps of:
   (a) for each original item of the original ordered set:
      (i) assigning an original index defining a sort order of the original item in the original ordered set as a function of a corresponding original value of the original item in the original ordered set; and
      (ii) incrementing the original index by a number of items in the new ordered set having a new value in sort order before the original value of the original item, thereby creating an original merged index, a resulting collection of original merged indices and corresponding original values defining a dynamically ordered set; and
   (b) for each new item of the new ordered set:
      (i) determining an initial index defining a sort order the new item would take in the original ordered set as a function of a corresponding new value of the new item relative to each original value of each original item in the original ordered set; and
      (ii) incrementing the initial index by a number of items in the new ordered set occurring prior to the new item in the new ordered set, thereby creating a new merged index, and the resulting collection of new merged indices and corresponding new values defining an exception table, wherein the exception table and the dynamically ordered set together define a virtual merger of the original ordered set and the new ordered set.

26. The method of claim 25, wherein steps (a)(i) and (b)(i) are performed by a first computing device, and at least step (a)(ii) is performed by a second computing device.

\* \* \* \* \*

UNITED STATES PATENT AND TRADEMARK OFFICE
CERTIFICATE OF CORRECTION

PATENT NO. : 6,999,968 B1
APPLICATION NO. : 10/306967
DATED : February 14, 2006
INVENTOR(S) : Robert E. Parkin It is certified that error appears in the above-identified patent and that said Letters Patent is hereby corrected as shown below:

On the Title Pg, Item -56-, under "Foreign Patent Documents", line 1, after "5/1993" insert -- G06F 15/40 --.

On the Title Pg, Item -56-, under "Foreign Patent Documents", line 2, after "4/1995" insert -- G06F 17/30 --.

On the Title Pg, Item -56-, under "Foreign Patent Documents", line 3, after "11/2001" insert -- G06F 12/00 --.

On the Title Pg, Item -56-, under "Other Publications", line 13, delete "Infromation." and insert -- Information. --, therefor.

In column 4, line 17, delete "EMBODIMENT" and insert -- EMBODIMENTS --, therefor.

In column 7, line 9, after "tables" insert -- . --.

In column 15, line 56, in Claim 7, delete "non contiguous" and insert -- non-contiguous --, therefor.

In column 15, line 58, in Claim 7, delete "non contiguous" and insert -- non-contiguous --, therefor.

Signed and Sealed this

Twenty-ninth Day of September, 2009

David J. Kappos
*Director of the United States Patent and Trademark Office*